United States Patent Office 3,714,840
Patented Feb. 6, 1973

3,714,840
DRIVE SHAFT
Walter K. Jekat, Munich, Germany, assignor to Klein Schanzlin & Becker Aktiengesellschaft, Frankenthal, Pfalz, Germany
Filed Sept. 29, 1971, Ser. No. 184,833
Claims priority, application Germany, Oct. 3, 1970,
P 20 48 681.1
Int. Cl. F16h *1/06, 1/20*
U.S. Cl. 74—421 A                5 Claims

ABSTRACT OF THE DISCLOSURE

A rotary shaft carries for rotation an externally toothed coupling gear, and axially spaced therefrom is a planetary drive having a sun gear and planetary gears which mesh with the sun gear and all of which are rotatable about axis paralleling that of the coupling gear. An internally toothed ring gear surrounds the primary gears and coupling gear and is movable axially between a first and a second position in which it is respectively in and out of mesh with the teeth of the coupling gear. It may be continuously in mesh with the planetary gears or it may be out of mesh with them when in the second position. A removable detent prevents the ring gear from moving out of its first to its second position, and another detent prevents the ring gear—when data has been moved from first to second position after removal of the first detent—for moving beyond the second position.

BACKGROUND OF THE INVENTION

The present invention relates generally to a drive unit, and more particularly to a drive unit utilizing a drive motor, a planetary gear and a device to which motion is to be transmitted, especially of vertical orientation.

It is already known in such a construction to transmit forces and torque with the aid of toothed coupling elements. U.S. Pat. 3,174,352 for instance discloses a unit of this general type which is intended for horizontal orientation and in which a relatively long tubular coupling element is provided which is formed at its opposite ends with internal annuli of teeth. This coupling element bridges the space which necessarily is provided in such a drive and transmits the torque of the drive shaft to the planetary gears of the planetary drive via a relatively narrow internally and externally toothed annular gear or ring gear. However, in order to make it possible to mount these planetary gears in the housing of the drive, it is necessary to provide pocket-shaped recesses in the housing for each of the planetary gears, a construction which makes it impossible to construct the housing of one piece. Instead, it is necessary in this construction to make the housing of two pieces which are of a configuration which is entirely different from one another with one piece serving as a cage for the gears and another serving for supporting purposes and for establishing the connection to the motor housing flange.

This construction is relatively complicated and expensive, both in terms of the number of parts required and in terms of the work required to produce them, as well as in terms of the expenditure involved in assembling the unit which latter operation is made rather difficult.

SUMMARY OF THE INVENTION

It is, accordingly, an object of the present invention to provide an improved construction which is not possessed of the above-outlined difficulties.

More particularly it is an object of the present invention to provide a drive unit of the type here under discussion in which the connection between the drive component and the planetary gear component is improved and so effected that under all circumstances, even under difficult assembly conditions, the one-piece housing can be utilized for the unit.

In pursuance of the above objects, and of others which will become apparent hereafter, one feature of the invention resides in a drive unit which, briefly stated, comprises a rotatable shaft and an externally toothed coupling gear mounted for rotation with this shaft. A planetary drive is axially spaced from the coupling gear and adapted to be driven by the same. The planetary drive comprises a sun gear, planetary gears meshing with the sun gear and rotatable about axis paralleling those of the sun gear and the coupling gear. It further comprises an internal toothed ring gear surrounding the planetary gears and coupling gear and being movable axially therewith between a first and a second position in which it is respectively in and out of mesh with the teeth of the coupling gear. First detent means is provided for preventing the ring gear from moving out of the second position in direction away from the first position, and second detent means is provided for preventing the ring gear from moving to the second position when it is in the first position.

Advantageously, and in accordance with a currently preferred consideration, the ring gear should remain in mesh with the planetary gears even when it is in the second position.

By resorting to the present invention the assembly of the unit is facilitated to a very substantial extent. The drive component—that is the shaft and the coupling gear—and the planetary gear can be individually assembled, without providing the annular gear or ring gear at this time. In fact, it is also possible to leave off the coupling gear and simply to assemble the shaft with its associated motor or the like. In preparation for the final assembly the coupling gear can be then mounted on the motor shaft and the presence of these components will not, as in the prior art, significantly hinder the subsequent assembly of the unit and possibly suffer damage on the teeth of the coupling gear. The reason for this is very simply that the annular gear can be moved to a position in which it does not interfere with such assembly, namely to the aforementioned second position, so that during the assembly the annular gear and the coupling gear will not be in mesh and the flange of the gear housing can be connected with the motor flange without any difficulty whatsoever.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
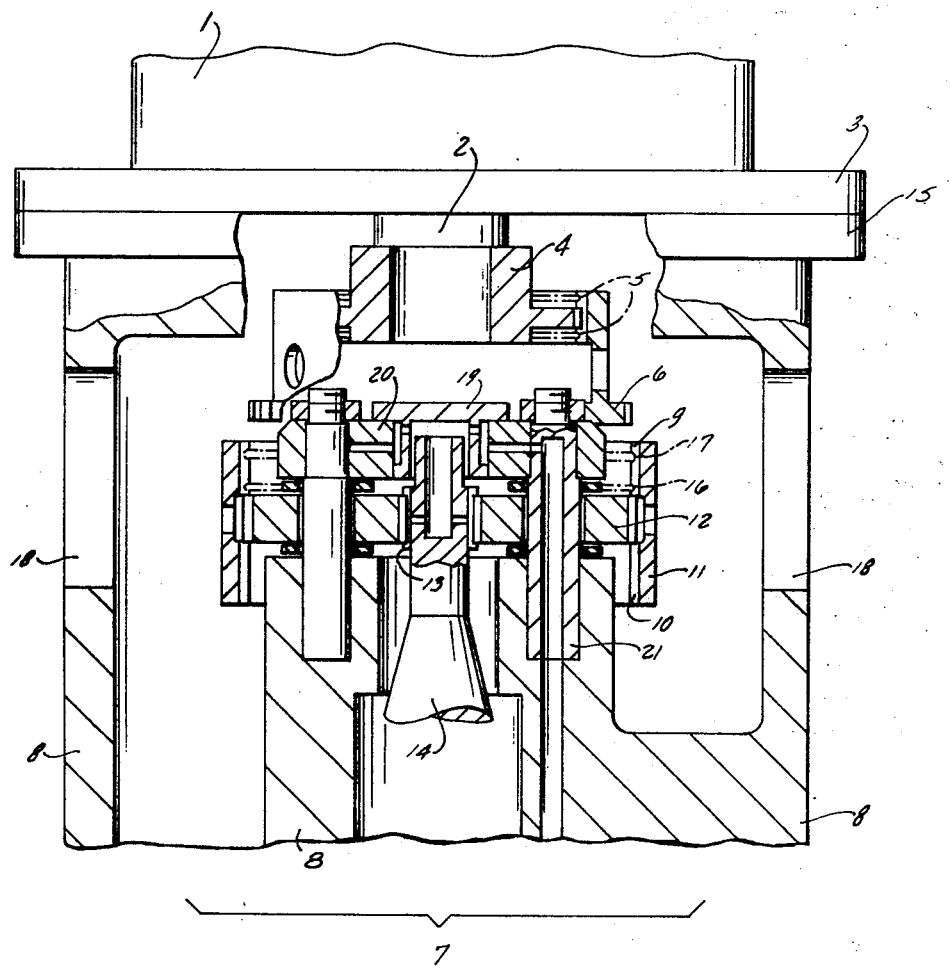
FIG. 1 is a longitudinal section of the drive unit prior to assembly.

Discussing now the drawing in detail it will be seen that the drive unit utilizes a diagrammatically illustrated motor 1 having a motor output shaft 2 which is of course rotatable. There is further provided a motor flange 3 and a toothed coupling hub 4 on which there is mounted a coupling gear 6 which rotates with the shaft 2 and is retained in place with circlips 5.

There is further provided a planetary gear 7 having a one-piece gear housing 8, and the two components, namely the motor with shaft 2, flange 3, element 4 and coupling gear 6 on the one hand and the planetary gear 7 on the other hand, are to be assembled. These components can each be assembled to a very substantial degree individually before their final assembly. The final drive unit in the illustrated embodiment is to be of upright type, but of course the invention is applicable to a construction of other-than-upright construction.

In the assembled operative condition the force and torque are transmitted from the shaft 2 of the motor 1 via the elements 4 and 6 to the planetary gear 7, via the annular gear 11 which is provided with an upper inner annulus 9 and a lower inner annulus 10 of teeth. The annulus 9 meshes in operative condition with the teeth of the coupling gear 6, and the annulus 10 meshes with the planetary gears 12 which in turn mesh with and transmit motion to the sun wheel 13 and thereby rotate the output shaft 14 of the planetary drive 7.

In accordance with the invention it is advantageous if the configuration of the teeth of the annulus 9 as well as those of the annulus 11 is identical, the number of teeth also being identical so that they can be produced in one and the same manufacturing operation. This has an additional advantage, namely that within different tolerance limits the annuli 9 and 10 are concentric with one another so that the gear 11 is much better centered with respect to the coupling gear 6, and vice versa, with the result that fewer vibrations than heretofore can develop.

The shaft 14 is radially journalled by the sun wheel 13 and the planetary gears 12. In addition, and especially for stopping and starting, an additional journalling is provided by the presence of an auxiliary journal 19 because during stopping or during a stationary condition the shaft 14 can readily often be laterally deflected because the centering forces of the teeth on the planetary gears are not active at such time. The auxiliary journal 19 is supported via the lubricating element 20 and the shafts 21 of the planetary gears with the portion of the housing 8 which supports these shafts 21.

The various components are assembled by assembling the drive component 1, 2, 3 with the coupling elements 4 and 6 on the one hand, to the gear component 7, 8, 15 by connecting the motor flange 3 and the gear flange 15 with one another. Before this assembly is carried out, and in order to facilitate such assembly, the tubular ring gear 11 is provided which is provided midway with several cutouts and is formed with the internal annuli 9 and 10 of gear teeth. According to the invention this ring gear 11 can be axially displaced with reference to the coupling gear 6 in the direction downwardly (in the drawing) and away from the coupling gear 6, to such an extent until its lowermost detent means—here illustrated as a circlip 16 which is lodged in an inner circumferential groove provided in the gear 11—will rest on the upwardly directed axial ends of the planetary gears 12. In this position, which is the second of two positions, the upper annulus 9 of gear teeth is out of mesh with the teeth of coupling gear 6. It is advantageous, but not necessary, that in this position the annulus 10 remains in mesh with the teeth of the planetary gears 12. In an alternative possibility, in which the annulus 10 could be allowed to move out of mesh with the teeth of the planetary gears 12, the teeth of the annulus 10 would of course have to be brought back into mesh with the teeth of the planetary gears 12 when the ring gear 11 is raised from second to first position in which the annulus 9 meshes with the teeth of the coupling gear 6.

Figure 2:
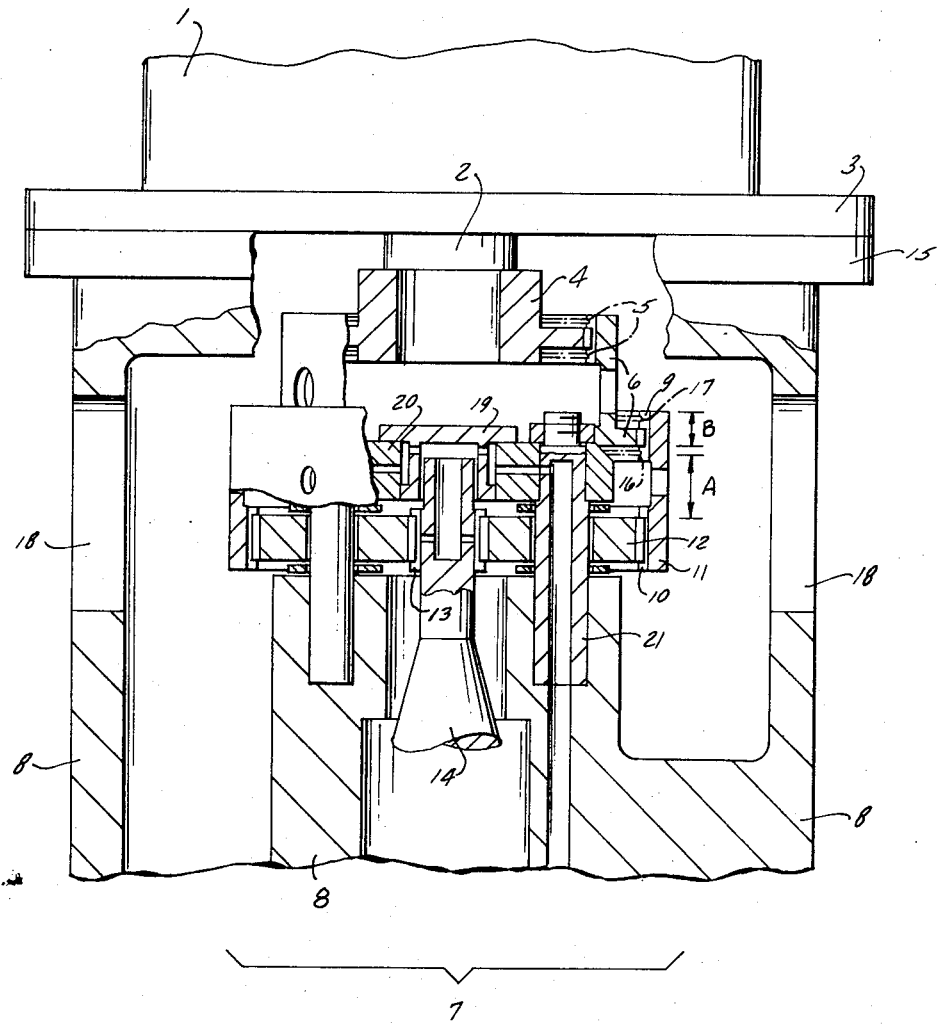
FIG. 2 is the same longitudinal section of the drive unit in FIG. 1, but after the assembly.

It is, however, currently preferred that the annulus 10 remain in mesh with the teeth of the planetary gears 12, which is achieved according to the invention in that the distance between the lower side of the circlip 16 to the upper edge of the annulus 10 is smaller than the axial length of the planetary gears 12. The coupling gear 6 and the downwardly displaced annular gear or ring gear 11—that is when the ring gear 11 is in its second position—are not in mesh at such time because the ring gear 11 is so configured that the distance A is greater than the distance B shown in FIG. 2. These distances—to be measured when the annulus 9 is in mesh with the teeth of the coupling gear 6, meaning that when the ring gear 11 is in its upper or first position—are shown in FIG. 2 and the distance A refers to the spacing of the upper axial end of the planetary gears 12 to the lower side of the circlip 11, whereas the distance B is the spacing from the lower axial end of the coupling gear 6 to the upper end or edge of the annular gear 11. Once the flanges have been connected, the final establishment of a driving connection between the components 4, 6 on the one hand and the drive 7 on the other hand is effected by axially displacing the annular ring gear 11 (upwardly in the illustrated embodiment) until the teeth of annulus 9 mesh with those of the coupling gear 6. A previously loosely positioned upper circlip 17 is now made to snap in an appropriate annular inner recess in the ring gear 11, as shown in FIG. 2, for which purpose lateral mounting or assembly openings 18 are provided in the one-piece housing 8.

Of course, it will be appreciated that the circlips can be replaced with other detent means, for instance appropriate pins or the like, such as beads or other suitable means.

The construction according to the present invention thus eliminates the heretofore necessary great care in guiding and assembling the various components, and the necessary additional holding and guiding devices which are required in the prior art for assembly purposes. Only at the very end of the assembly procedure are the coupling gear and the ring gear placed into mesh, in a manner which is as simple as it is speedy. A mere axial displacement of the ring gear in the sense placing it in mesh with the coupling gear, and at most an additional slight turning of one of the gears with reference to the other will establish the necessary mesh between them, and the use of a circlip or similar means for maintaining the ring gear in its first position in which it meshes with the coupling gear establishes the maintenance of the ring gear in this first position in a simple manner. Only the present invention, utilizing the axially displaceable ring gear 11 makes it possible to achieve such a simple connection and in this manner it is no longer necessary to construct the housing 8 of two pieces as was heretofore required. One or several lateral mounting openings, illustrated at 18 in the drawing, suffice fully to afford the necessary access for assembly and need extend only over a portion of the circumference of the housing 8.

Of course, and especially with the use of the circlips, a subsequent disassembly of the unit is very simple by first removing the circlip 17, displacing the ring gear 11 until the circlip 16 maintains it in its second position, and then reversing the previous assembly steps to disassemble the various components for repair or the like.

The identity of configuration of the annuli of teeth 9 and 10 substantially reduces the difficulty and time required for producing them and thus contributes to greater simplicity and less expense of the novel construction.

It will be understood that each of the elements described above, or two or more together, may also find a useful application in other types of constructions differing from the types described above.

While the invention has been illustrated and described as embodied in a drive unit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A drive unit, comprising a rotatable shaft; an externally toothed coupling gear mounted for rotation with said shaft; a planetary drive axially spaced from said coupling gear and adapted to be driven by the same, said planetary drive comprising a sun gear, planetary gears meshing with said sun gear and rotatable about axes paralleling those of said sun gear and coupling gear, and an internally toothed ring gear surrounding said planetary gears and coupling gear and being movable axially thereof between a first and a second position in which it is respectively in and out of mesh with the teeth of said coupling gear; first detent means for preventing said ring gear from moving in and out of said second position in direction away from said first position; and second detent means for preventing said ring gear from moving to said second position when in said first position.

2. A drive unit as defined in claim 1, said ring gear having a pair of axially spaced recesses in its inner periphery; and wherein said detent means comprises a pair of detent members each releasably retained in one of said recesses at opposite axial sides of said coupling gear.

3. A drive unit as defined in claim 2, wherein said recesses extend circumferentially of said ring gear, and wherein said detent members are circlips one of which engages said coupling gear at an axial side thereof remote from said planetary gears when said ring gear is in said first position, and the other of which engages said planetary gears at an axial side facing said coupling gear when said one circlip is removed and said ring gear is in said second position.

4. A drive unit as defined in claim 1, said ring gear having a pair of axially spaced internal annuli of teeth, and wherein the number and cross-section of the teeth is identical in both of said annuli, permitting both annuli to be produced in a single manufacturing operation.

5. A drive unit as defined in claim 1, said ring gear having a pair of axially spaced internal annuli of teeth one of which is adapted to mesh with said coupling gear and the other of which is adapted to mesh with said planetary gear, and wherein the relative position of said annuli, coupling gear and planetary gears are so correlated that said other annulus is in mesh with said planetary gears when said ring gear is in said second position and said one annulus is out of mesh with said coupling gear.

References Cited

UNITED STATES PATENTS

| 2,252,967 | 8/1941 | Forton | 74—413 |
| 3,528,310 | 9/1970 | Haentjens | 74—413 X |

FOREIGN PATENTS

| 632,463 | 8/1936 | Germany | 74—413 |

LEONARD H. GERIN, Primary Examiner

U.S. Cl. X.R.

74—413